Nov. 18, 1930.  J. C. MacILDOWIE  1,781,728
METHOD AND APPARATUS FOR PREPARING WET MIXTURES
Filed Oct. 29, 1927  7 Sheets-Sheet 1
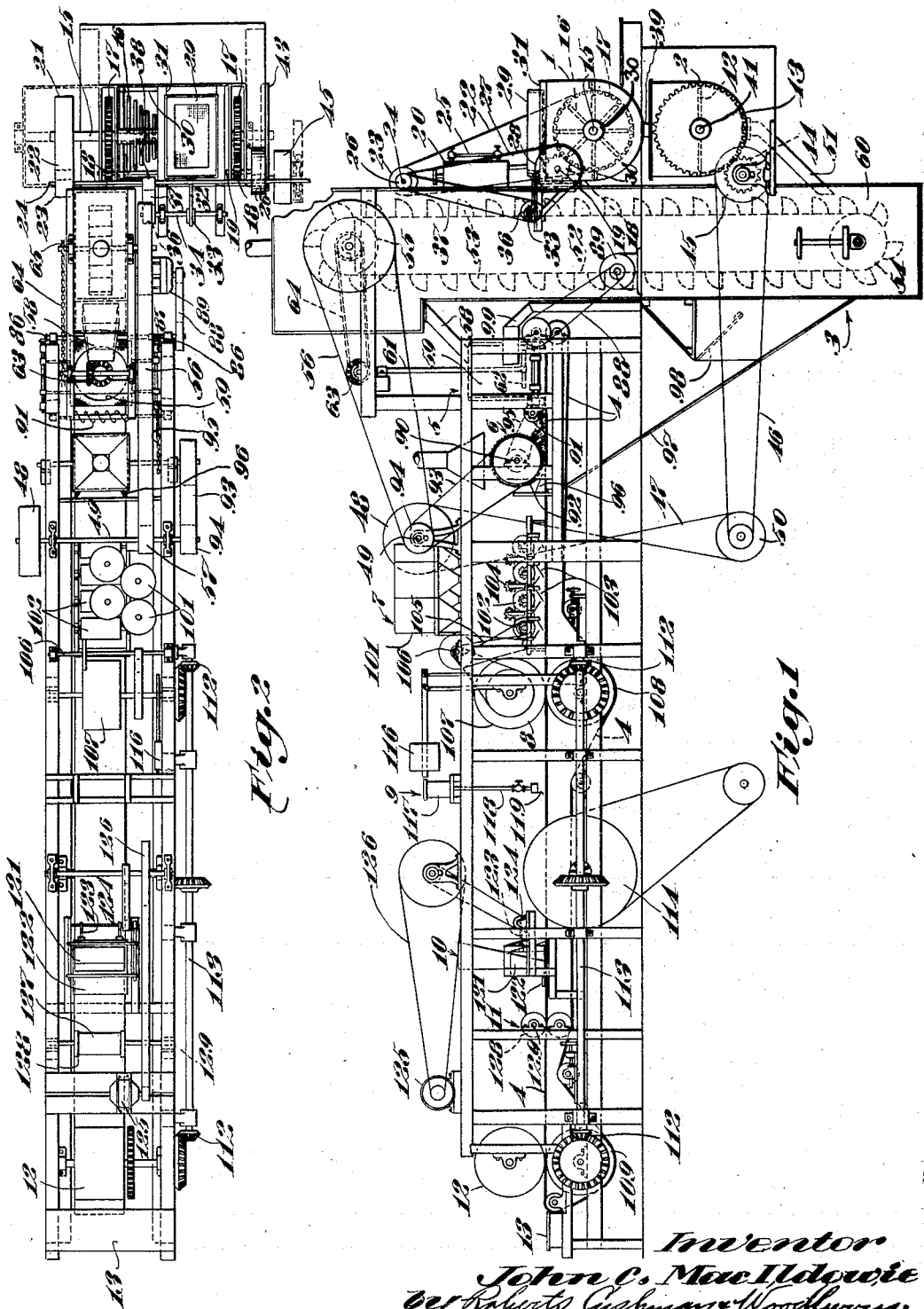

Nov. 18, 1930.　　J. C. MacILDOWIE　　1,781,728
METHOD AND APPARATUS FOR PREPARING WET MIXTURES
Filed Oct. 29, 1927　　7 Sheets-Sheet 3
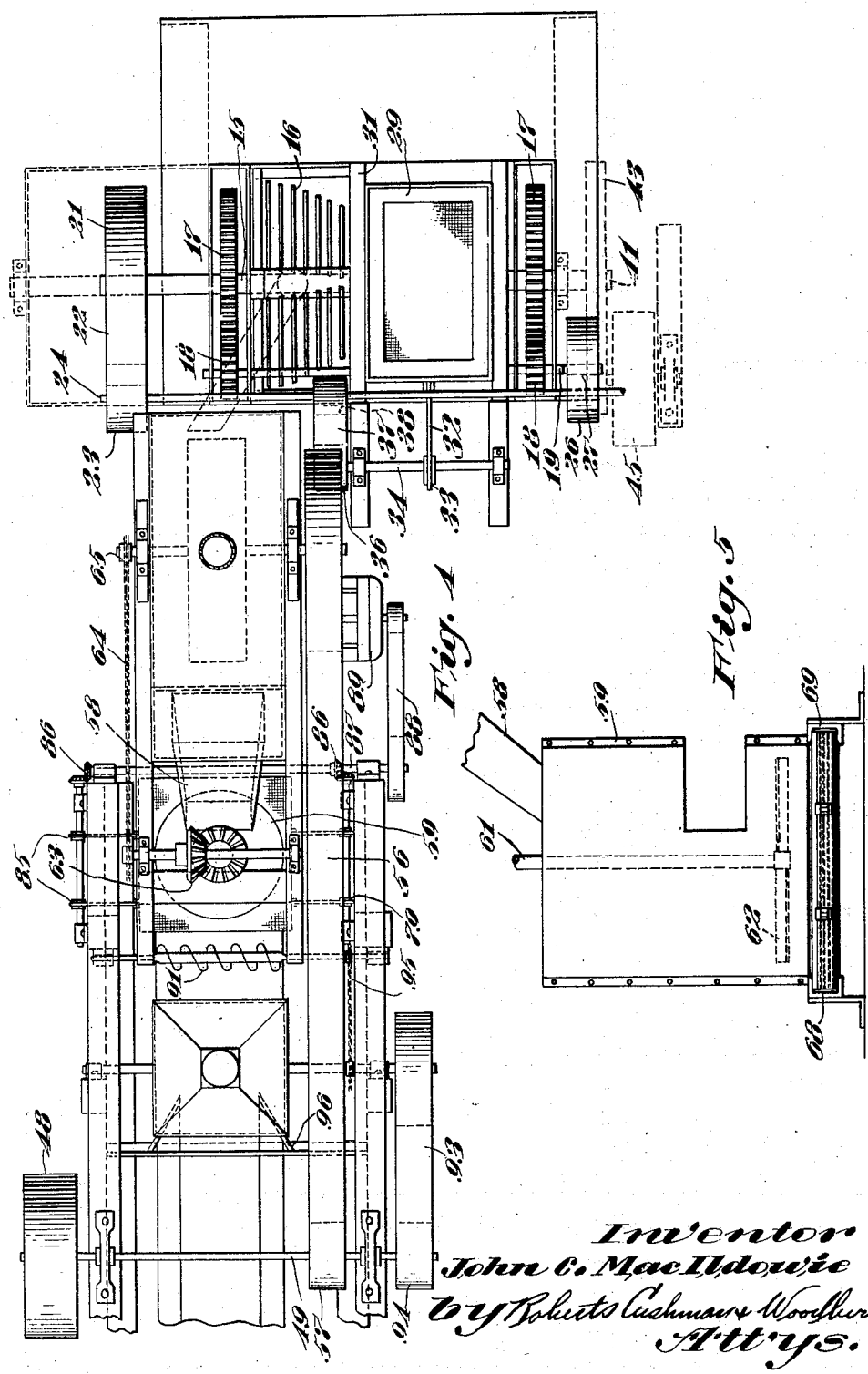

Nov. 18, 1930. J. C. MacILDOWIE 1,781,728
METHOD AND APPARATUS FOR PREPARING WET MIXTURES
Filed Oct. 29, 1927 7 Sheets-Sheet 4

Inventor
John C. MacIldowie
by Roberts Cushman & Woodbury
Attys.

Nov. 18, 1930.　　　J. C. MacILDOWIE　　　1,781,728
METHOD AND APPARATUS FOR PREPARING WET MIXTURES
Filed Oct. 29, 1927　　　7 Sheets-Sheet 5

Inventor
John C. MacIldowie
by Roberts, Cushman & Woodbury
attys.

Nov. 18, 1930.  J. C. MacILDOWIE  1,781,728
METHOD AND APPARATUS FOR PREPARING WET MIXTURES
Filed Oct. 29, 1927  7 Sheets-Sheet 6

Inventor
John C. MacIldowie
by Roberts Cushman + Woodbury
Att'ys.

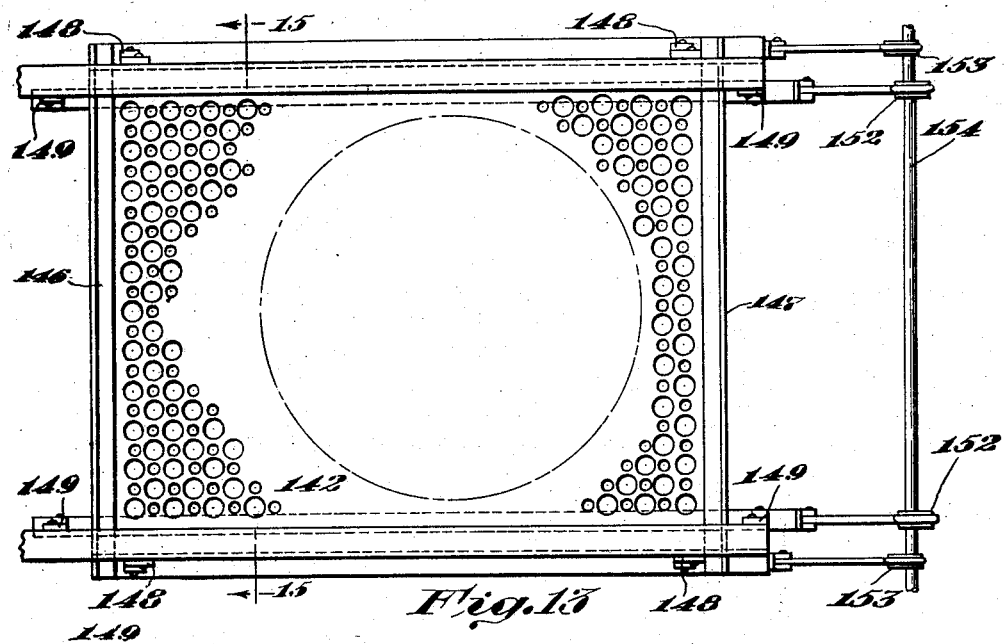
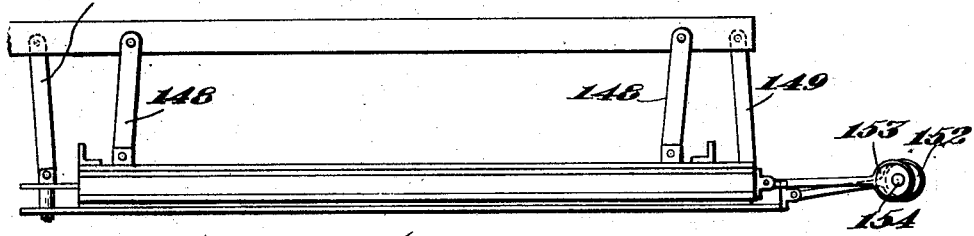
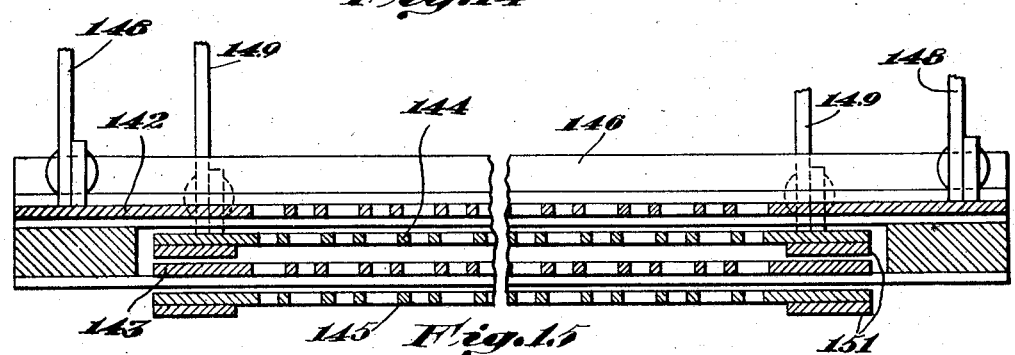
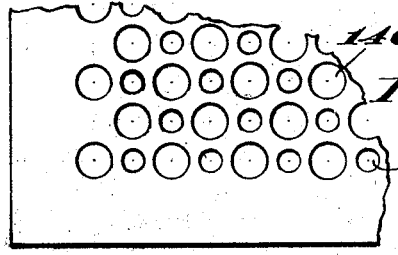

Patented Nov. 18, 1930

1,781,728

UNITED STATES PATENT OFFICE

JOHN C. MacILDOWIE, OF NASHUA, NEW HAMPSHIRE, ASSIGNOR TO ASBESTOS WOOD & SHINGLE CO., OF NASHUA, NEW HAMPSHIRE, A CORPORATION OF NEW HAMPSHIRE

METHOD AND APPARATUS FOR PREPARING WET MIXTURES

Application filed October 29, 1927. Serial No. 229,771.

This invention relates to a method of and apparatus for preparing and manipulating wet or semi-wet mixtures of materials,—which are ordinarily subject to the formation of aggregates or lumps,—in the form of a homogeneous supply or deposit of finely divided and discrete particles.

It has long been a source of difficulty in the art of handling plastic or semi-wet mixtures of various materials, that many of such mixtures tend to form aggregates or lumps. These lumps are seldom if ever desirable and in fact may present many difficulties or even prohibit certain operations upon such mixtures which would otherwise be desirable and possible to accomplish. Hence the nature and quality of the products which may be fashioned therefrom are practically confined to the limits of operation prescribed by the conditions which must be observed in order to prevent this occurrence.

It is therefore an object of the present invention to provide a method and apparatus for the preparation and handling or working of such wet ("semi-wet" or "dry-molding") mixtures which normally tend to ball up, whereby the several ingredients of the mixture may be compounded and reduced to an intimate admixture of substantially uniform composition and physical properties and whereby the mixture may be fashioned into desired shapes without the formation of lumps which are often produced in the practices now known to the art.

The invention broadly includes the discovery that mixtures of materials tending to ball up may be prepared without such balling by mixing the several ingredients (typically with a liquid content intermediate between that quantity which is necessary to dampen the solids of the charge and that which would produce a fluid mixture) as by a rapid churning and impact of the mix and thereafter subjecting the semi-wet mixture to a succession of loosely shearing operations. The thus disintegrated charge may then be deposited directly, as by gravity, into forms or other receptacles, while preserving the particles, substantially without relative movement. Subsequent treatments may now be carried out upon the deposited charge, such as compacting, integrating, finishing, etc., according to the usual practices of the art of molding and finishing, etc., according to its specific properties and the uses for which it is intended.

Mixtures which contain fibrous substances such as asbestos are especially subject to the difficulties attendant upon "balling" and the present invention is found to be particularly well adapted to prepare and handle this class of materials.

A typical application of the invention will be described with reference to the preparation of asbestos-cement mixtures and the fabrication of sheet materials, such as shingles, therefrom. The apparatus employed for this purpose may be readily constructed and conveniently operated,—either alone or in conjunction with the so-called "duplex" method and machine,—as heretofore practiced for making sheet materials from dry mixtures and simultaneously applying a coating of granular material to the surface.

Such an apparatus is illustrated by the accompanying drawings, in which:—

Fig. 1 is a side elevation of the apparatus as a whole;

Fig. 2 is a plan view of the apparatus as shown in Fig. 1;

Fig. 4 is an enlarged plan view of the right hand side of Fig. 2 including the de-lumping device of Fig. 3;

Fig. 5 is an enlarged elevation of the hopper and screens;

Fig. 13 is a detail plan view of the perforate sheets or screens shown in Figs. 11 and 12;

Fig. 14 is a side elevation of the screens shown in Fig. 13;

Fig. 15 is a detail cross section of the screens on line 15—15 of Fig. 13; and

Fig. 16 is an enlarged detail, with parts broken away, of the corner of a single screen.

Figure 3:
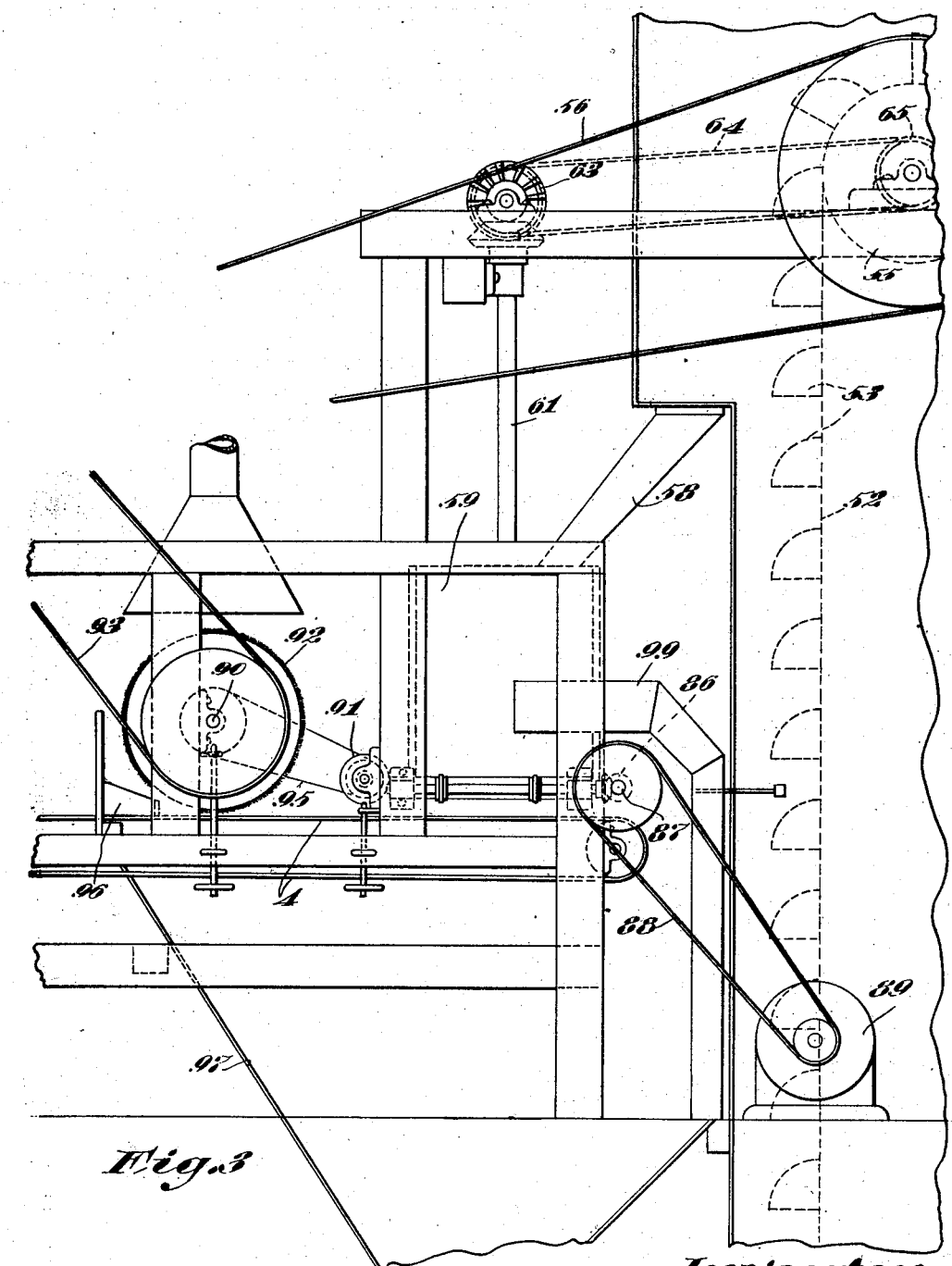
Fig. 3 is an enlarged detail elevation of the de-lumping device of the apparatus as shown by Fig. 1, the remaining parts being broken away.
Figure 6:
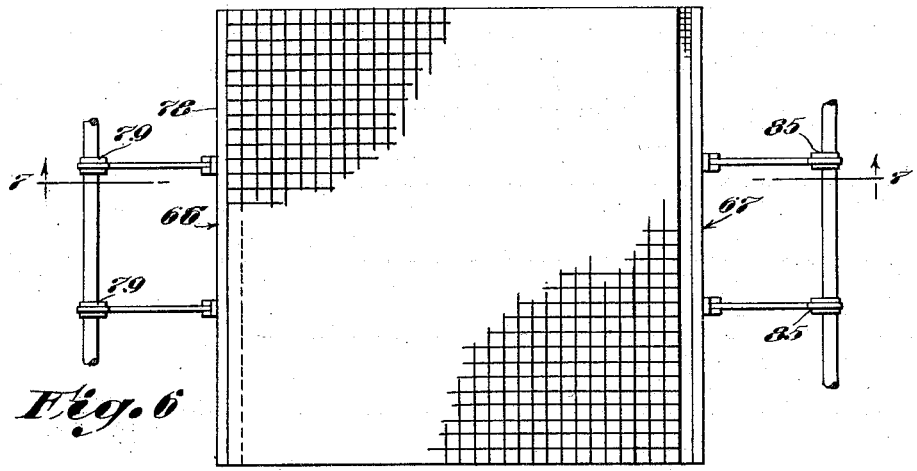
Fig. 6 is a plan view of the screens.

Referring to the drawings, and more particularly to Figs. 1 and 2, the apparatus comprises in general, a preliminary mixer 1, a second mixer 2, standing below the first and adapted to receive a charge therefrom and to deliver to an elevator 3, which is followed by a horizontal endless belt 4, above which are arranged in sequence a de-lumping device indicated generally at 5, a levelling device 6, a depositor 7, a compression roller 8, a water curtain 9, a salt spreader 10, a cutting knife 11, a second compression roller 12, and an off-take table 13. The several elements of the machine are provided with driving mechanisms either independently operated or connected to a common source of power,—but operable to a greater or less extent in synchronism each with the other, as hereinafter set forth.

The mixer 1 is a generally cylindrical tank, having an open top and provided with a horizontal axis 15 passing longitudinally therethrough carrying a plurality of mixing arms 16 arranged along the axis in the form of a helix and extending radially outward to almost touch the walls of the mixing chamber. Gear wheels 17, (outside and at either end of the mixing chamber) mesh with gears 18 on shaft 19. The gear wheels 17 are mounted on sleeves 30, surrounding the shaft 15, which pass through the wall of the mixer and support the ends of a rectangular scraper 30' in the mixer 1.

At one end of the axis 15 is a pulley 21, carrying a belt 22 which passes over pulley 23 on shaft 24. This shaft also carries a pulley 26 having a belt 27 which passes over a pulley 28 on the end of shaft 19 (Fig. 1).

A screen 29 is mounted upon a slide 31 above the mixer 1 and is attached by rod 32 to an eccentric 33, which in turn is mounted on a shaft 34, having a pulley 36 at one end and driven by belt 37 passing over pulley 38 on shaft 24. Thus, shaft 15 is driven by belt 22 from shaft 24, while shaft 19 is driven from the shaft 24 by belt 27, shaft 34 by belt 37, and scraper 30' from shaft 19 through gears 17, 18. The shaft 24 is in turn driven from any suitable source of power (not shown). Above the mixer 1 is provided a water measuring tank 20 with gauge glass 25 adapted to measure and discharge water into the mixer.

The lower mixing chamber 2 (connected to the upper mixer through a man hole 39) is provided with a shaft 41, carrying a helical blade 42 driven by gear 43 at the end. The latter, in turn, is driven from fixed gear 44 mounted on the same axis with pulley 45 which is actuated through belts 46, 47, from pulley 48 on the main driving shaft 49 through the idler pulley 50. From the bottom of the mixer 2 a conduit 51 leads into the bottom of the elevator chamber 60.

The elevator 3 consists of an endless belt 52 with buckets 53 passing over fixed pulleys 54, 55, the upper pulley being driven by belt 56 which passes over pulley 57 on the main driving shaft 49.

A chute 58 leads from the delivery end of the elevator to the vertical hopper 59 of the de-lumping device 5. This is substantially cylindrical and carries a vertical shaft 61 having horizontal agitator blade 62 at its lower end which is driven through bevel gears 63 at its upper end by chain 64 passing over a cog wheel 65 on the shaft of the elevator pulley 55.

Figure 7:
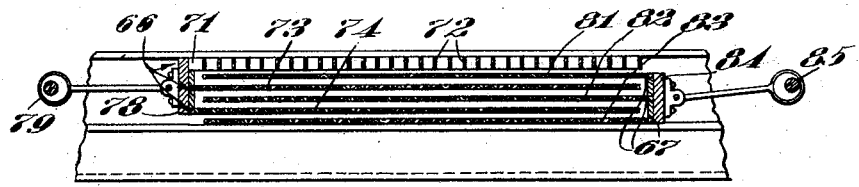
Fig. 7 is a cross section of the screens on line 7—7 of Fig. 6.
Figure 8:
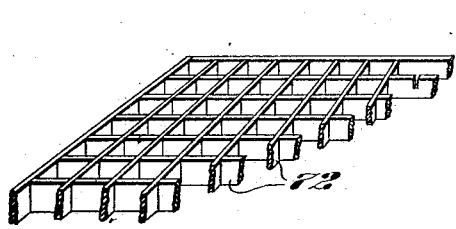
Fig. 8 is a perspective view, with parts broken away, of the top screen.
Figures 9, 10:
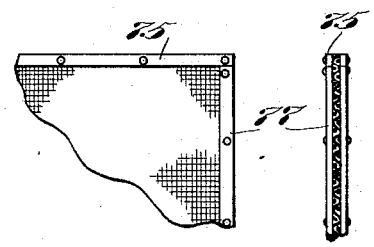
Fig. 9 is a detail plan view, with parts broken away, of a corner of one of the lower screens.
Fig. 10 is a detail view of an edge of one of the lower screens.
Figure 11:
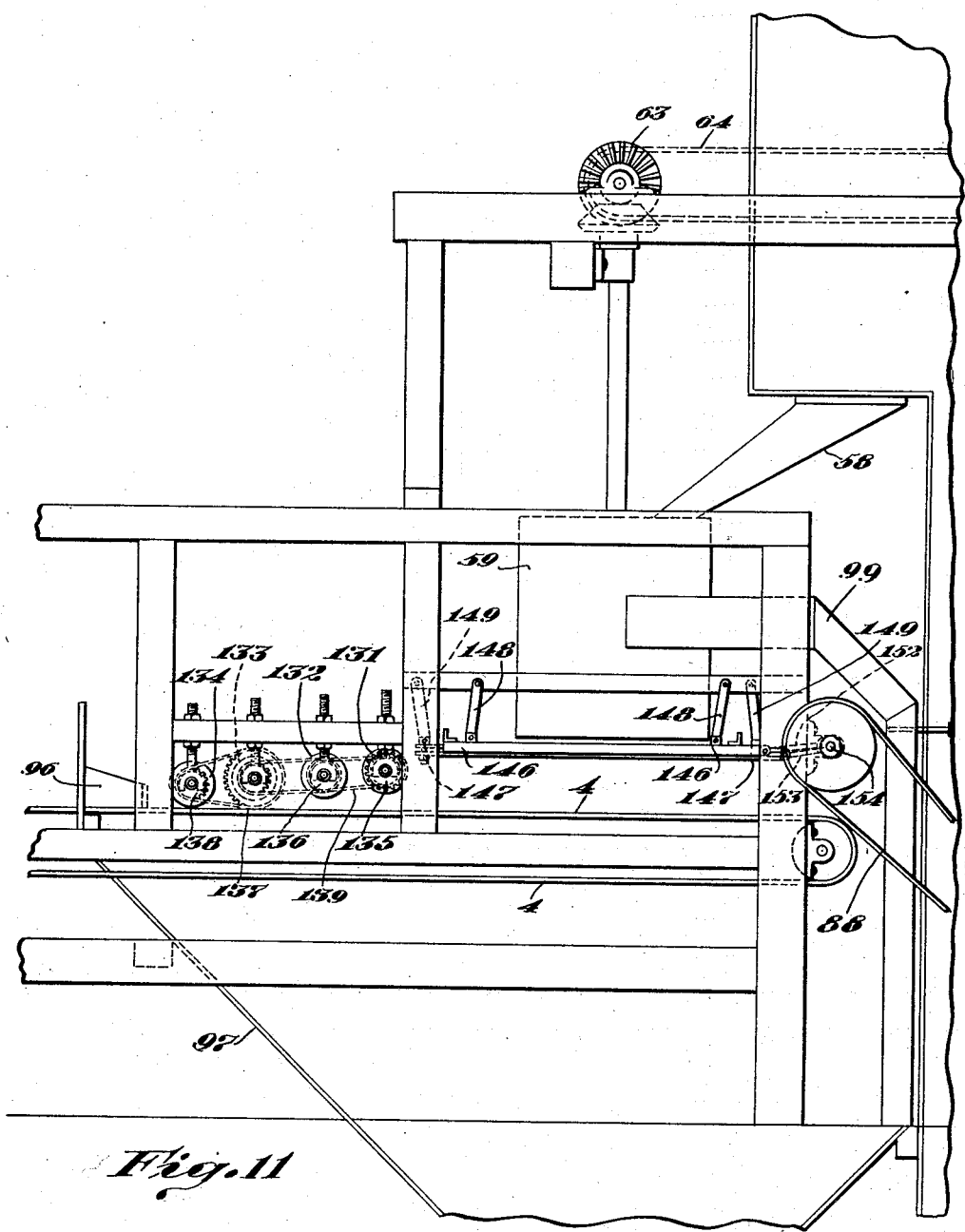
Fig. 11 is a side elevational view of apparatus, including a modification of the de-lumping device, with parts broken away.

Beneath hopper 59 and above the upper surface of the belt 4, is mounted a set of horizontal, oscillating screens (Figs. 5–10) comprising two series 66, 67, of three screens each, sliding between horizontal guides 68 and 69. The screens of the first series 66, comprise a top screen 71, made up, for example of metallic strips 72 (one-half to three-quarters of an inch wide) which are slotted transversely and fitted together, (Fig. 7) thus forming a deep grid as shown in Fig. 8. The two lower screens 73, 74 may be made of wire mesh bound with rigid metal strips 75, 77 (Figs. 9 and 10) and reinforced with similar crosspieces if necessary. The lower screens of the set may have a successively finer mesh than the upper screens. All three screens of the series 66 are attached at one end to a mounting 78 which is connected to the eccentric 79. The second series of screens 67 stand between and alternate with the screens of the first series, and comprise three screens 81, 82, 83 which may be made similar to screens 73, 74 as above described and preferably of decreasing mesh size. These are attached at their ends (opposite to the mounting 78) to a common mounting 84 connected to an eccentric 85. The eccentrics 79 and 85 are driven, through bevel gears 86, 86, on shaft 87 which in turn is driven by belt 88 from motor 89.

Following the de-lumping device or screens 5, and standing transversely above the belt 4 is a spiral blade or distributor 91, followed by a cylindrical brush 92, mounted on a horizontal axis 90 and at an adjustable height above the belt. The brush is rotated by a belt 93 passing over pulley 94 on driving shaft 49, while the distributor 91 is rotated by a chain 95 passing over the axis of the brush.

Scrapers 96 are mounted at either side of the belt, to remove excess material from the margins. The side walls (not shown) of the elevator chamber 60 extend along either side of the belt 4, to catch the excess mixture therefrom and enclose a chute 97, leading back to the bucket elevator 3 through gate 98. An overflow conduit 99 also leads from hopper 59 back to the elevator chamber 60.

The depositor 7 comprises a series of supply tanks 101, for containing granular material, feeding into hoppers 102, from which the granular material passes through slots (not shown) to fall upon baffles 103, and thence upon the layer of mixture on the belt 4, by gravity. Distributor blades (not shown) passing longitudinally through the hoppers are driven through gear wheels 104 by belt 105 from shaft 106 which in turn is driven by compression roller 107, riding upon the belt 4.

The belt 4 is driven by roller 108, standing beneath the belt 4 below compression roller 107 and also by roller 109 (under fixed compression roller 12 at the end of the belt) both of which are driven through bevel gears 112, from shaft 113 which is driven from any suitable source of power, applied to pulley 114, geared thereto. The degree of compression effected by roller 107 may be governed by the leverage of counterweight 116 acting upon the bearing in which it is mounted.

The water curtain 9 is provided from a water tank 117, having a valved outlet pipe 118 and a spreader 119 standing above and transversely across the belt 4.

The salting device 10 comprises a hopper 121 having an outlet at the bottom standing transversely of the belt 4 and a horizontally projecting shelf 122 therebelow. The hopper (or the shelf 122) is mounted for short horizontal movement on arm 123 which is attached to an eccentric 124 driven from motor 125 by belts 126.

The cutting device 11 consists of a pair of blades 127 mounted between rollers 128 which are carried in fixed bearings 129 and rest upon belt 4, by which they are revolved.

The compression roller 12 is mounted to rest upon the belt 4, immediately above the positively driven roller 109,—the belt being received therebetween and passing thence under the off-take table 13 which is substantially tangential to the belt surface.

In operation, a charge of the ingredients of the mixture to be used is introduced into mixer 1. For example, for the purpose of making asbestos shingles a quantity of dry disintegrated asbestos fiber may be sifted into the mixer through the sieve 29, a proportionate amount of bond such as Portland cement is added, and the required amount of water let in from the water measuring tank 20. The ingredients may be added in any order, but preferably gradually and with continued mixing. The proportions may be, for example, 900 lbs. of asbestos and Portland cement in admixture of suitable proportions and up to 18 or 20% e. g. 150 lbs. of water. Power is applied to shaft 24 and thence to shaft 15, whereupon the mixing blades 16 are revolved, and to scraper 30 through shaft 19 and gears 18, 17. The ingredients are thereby agitated and brought into intimate contact with each other.

When thoroughly mixed, the charge is dropped into mixer 2, through manhole 39, and further agitated by rotation of helical blades 42 which convey it gradually to the outlet pipe 51 through which it passes into the bottom of the elevator. Buckets 53 receive or gather up the mixture and raise the same to the top of the elevator housing, discharging it as they pass over pulley 55 into the chute 58. The blades in the second mixer and the elevator are operated by suitable belt connection from the main driving shaft 49, as already described.

As the mixture is discharged from chute 58 into hopper 59 it may be kept in movement by agitator 62, (driven from the elevator pulley 55) any accumulated excess passing off through outlet 99 into the elevator housing. The bottom portion of the mixture in hopper 59 therefore rests upon the top of screen 71 but is kept in continued motion thereover.

The two series of screens 66, 67 are continually oscillated back and forth in opposite directions. The material thus agitated above the upper screen passes in a more or less dispersed condition through the meshes of the uppermost screen, together with any lumps which may be small enough to enter the openings in the upper screen. Large lumps are reduced by the attrition or impact action of the agitator and of the upper surface of the screen or grid. The wide strips forming the upper screen or grid 71 thus serve to receive and enclose such lumps as may pass therethrough but permit the lower portions of the lumps gradually to emerge and encounter the loose, transverse shearing action between the screens, effected by virtue of the opposed oscillations of the screen next below as well as of the mixture standing between the two screens. The finer mesh of the next screen prevents the larger lumps from passing on until they are appreciably reduced in size. As the material passes through the second screen it is still further reduced in a similar manner, before passing through the third screen. Likewise, as the material passes in a substantially continuous stream through the successive screens, it is still further disintegrated and dispersed into finer and finer particles or aggregates, until it passes through the lowest screen in a shower of substantially dispersed individual particles, all slightly wet but separated by intervening curtains of air which permit them to fall severally and separately upon the belt 4 below.

In this condition the belt 4 conveys the mixture, in the form of a relatively continuous and uniform deposit under the distributor blade 91 which rotates and carries off any superficial excess from the top, leaving a deposit of uniform thickness, which is still further reduced to the desired thickness (and hence a definite quantity of material) by rotation of the cylindrical brush 6,—the surplus falling off at the sides of the belt into the chute 97 and being returned to the original supply in the elevator 60.

As the belt passes from beneath the brush 6, the scrapers 96 on each side, contacting with the surface of the belt and directed outwardly, remove the mixture from the margins of the belt and leave the mixture in a band of predetermined width to pass therebetween. This determines the width of the sheet or shingle that is to be made.

As this strip or band of the loosely deposited mixture passes beneath the depositor 7, crushed slates or other granular material may be deposited upon and into its fluffy texture and be subsequently consolidated therewith and therein by passing between the compression rollers 8. The integrated, continuous sheet as thus formed is now wet with a curtain of water at 9, if necessary, and may also be coated with a layer of coarse salt from the salt spreader 10, (for the purpose of forming pits in the upper surface by subsequently dissolving and washing out the salt). But with or without such application of granular material and/or salt, the sheet may then be cut into the desired lengths by the revolving knife 11, followed by a second compression treatment under roller 12, when it is discharged upon the off-take table 13.

Either or both of the deposits,—e. g. crushed slate and salt,—may be omitted if desired, leaving a smooth sheet of uniform composition and characteristics.

The sheet is cured and the cement,—with additional increments of water, if necessary, is allowed to set.

The salt crystals, if used, are dissolved and washed off as with water or hydrochloric acid, leaving a pitted surface, while the crushed slate deposit will be irregularly deposited and embedded in the surface of the sheet, and firmly retained thereby.

It is found that, in using a brush for leveling the deposit of asbestos cement mixture upon the belt, if the asbestos fibers be of good quality and hence relatively long, for example several inches, they become entangled with the brush and accumulate thereon. To remedy or prevent this occurrence and thus permit the use of long fiber asbestos in the mixture, the revolving brush may be replaced by one or more revolving blades of a generally helical shape such as the blades 131, 132, 133, 134 shown in Fig. 12 passing horizontally across the belt and spaced at successively decreasing heights above its upper surface. The last blade 134 is so positioned as to determine the thickness of the deposited layer of asbestos-cement mixture. The rates of rotation of the successive helical blades may be increased, the last being revolved the most rapidly.

Figure 12:
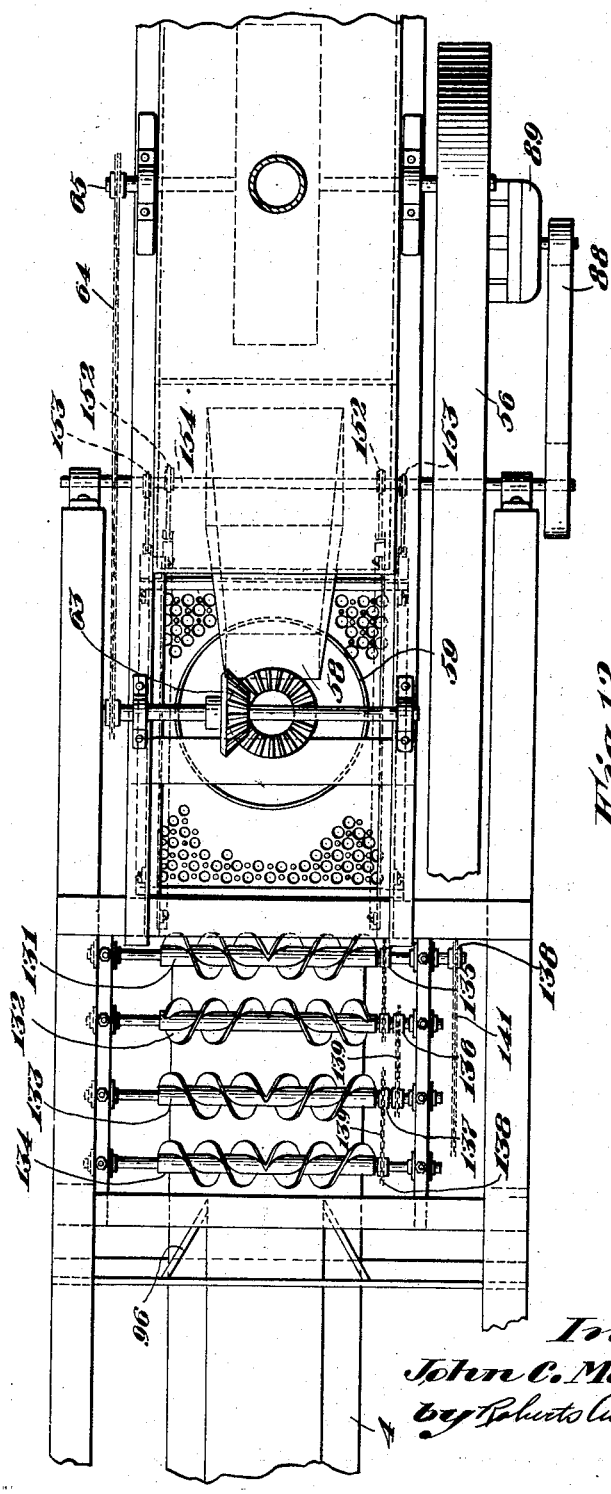
Fig. 12 is a plan view of the apparatus as shown in Fig. 11, with parts broken away.

The blades 131, 132, 133, 134 may be driven by sprocket wheels 135, 136, 137, 138 respectively through sprocket chains 139, and from sprocket chain 141 suitably connected to shaft 49. The helices of the blades 131, 132, 133, 134 may preferably be oppositely disposed or may extend in opposite directions from the center to both ends,—or both arrangements may be employed as shown in Fig. 12.

The screens may also be replaced by two pairs of perforate metallic sheets 142, 143, and 144, 145, in alternating position and supported by separate heads 146, 147, respectively and suspended by links 148, 149, pivoted to the frame of the machine. The screens thus provided may be reinforced by metallic strips 151 and are connected to oppositely oscillating eccentrics 152, 153 mounted on axis 154. The perforations 140, 150 may be of any desired order of size or sizes and of different arrangements. As shown, the pattern is regular with the larger size of round openings 140 uniformly and alternately interspersed with smaller openings 150. Again, the openings in successive screens may be of the same sizes or of varied sizes and shapes, according to the dictates of experience with any given material and the conditions to be imparted to the mixture thereby.

The operation of the apparatus is substantially the same as that already described with respect to the form of apparatus shown in Figs. 1 to 11 inclusive.

The mixture is discharged through hopper 59 upon the top screen. The two sets of screens are simultaneously oscillated in opposite directions (longitudinally of the belt 4), whereupon the material passes through the perforated sheets and is subjected to direct attrition or shearing between the two screens, and thus successively reduced, without compacting, as it passes through the series of screens and falls upon the belt 4, by gravity, without appreciable relative movement of the several particles. The particles are thus deposited upon the belt to form a continuous layer of material, free from lumps or other irregularities of texture, concentration or distribution of the several ingredients of which it is composed.

This layer may be so controlled as to provide the desired thickness, or quantity of material deposited on the belt 4. More usually, however, the deposited layer will be somewhat thicker than required. To reduce this layer to the thickness desired, the blades 131, 132, 133, 134 may be adjusted to successively lower positions, the last preferably being spaced the desired distance from the surface of the belt 4. The blades are then rotated, and as the belt, loaded with the deposited mixture on its upper surface passes beneath them, they remove the upper portion and convey it to either side of the belt from which it falls into the chute 97 or is subsequently removed by the scrapers 96. By employing blades having opposed helices the tendency toward excessive transfer of the material,—as for example from the center of the sheet to the sides of the sheet, or from one side to the other,—is avoided. This variation in level may be availed of to advantage, however, to form a sheet of varying thickness,—as for tapered shingles, if desired. The latter effect may be more positively provided by sloping the axis of the helical blades and may be preserved by correspondingly sloping the axis of the compression rollers. In this procedure, the material of the deposit is not required to "flow" but is consolidated, in situ, in substantially the same relative degree of concentration and density throughout.

The succeeding operation of compressing and shaping the deposited material may also be similar to those already described or as heretofore known to the art of fabricating materials of the general character herein described.

In the ways described a consolidated sheet of uniform composition and properties is produced, presenting a hard surface, of uniform texture and high resistance to wear and weather. Moreover, the operations may be carried on continuously, the several materials functioning in a proper manner and a satisfactory standard of product being assured. But especially is it to be observed that the supply of mixture and also the sheet produced is free from lumps or aggregates of the mixture, that the bond is effectively contacted with the asbestos fiber, in uniform distribution through the sheet, and that all of the cement is wet and caused to set either by the initial moisture alone or by this in conjunction with the subsequently applied moisture imparted to the sheet.

I claim:

1. Method of producing a uniform mixture of discrete, semi-wet particles, which comprises subjecting a supply of the same to a loose shearing action.

2. Method of producing a uniform mixture of discrete semi-wet particles characterized by a tendency to balling, which comprises subjecting the same in the form of a continuous stream to a succession of rapid transverse shearing movements.

3. Method of producing a uniform mixture of discrete semi-wet particles characterized by a tendency to balling, which comprises subjecting the same in the form of a continuous stream to a succession of rapid transverse shearing movements in alternating directions.

4. Method of producing a uniform mixture of discrete semi-wet particles characterized by a tendency to balling, which comprises feeding the same by gravity through a pair of closely spaced, oppositely oscillating screens.

5. Method of producing a uniform mixture of discrete semi-wet particles characterized by a tendency to balling, which comprises causing the same to pass successively into contact with foraminous screens, closely spaced and moving oppositely in respect to the particles.

6. Method of producing a uniform mixture of discrete semi-wet particles, characterized by a tendency to balling, which comprises causing the same to pass successively into contact with solid bodies having passages between them and moving back and forth at an angle to the path of said particles, the amplitude of motion of said bodies being equal to or greater than the width of the passages.

7. Method of producing a uniform mixture of discrete semi-wet particles, characterized by a tendency to balling, which comprises causing the same to pass by gravity successively into contact with solid bodies having passages between them and moving back and forth at an angle to the path of said particles, the amplitude of motion of said bodies being equal to or greater than the width of the passages.

8. Method of producing a uniform mixture of discrete semi-wet particles characterized by a tendency to balling, which comprises causing the same to pass successively into contact with and through spaced foraminous screens closely spaced and moving in opposite directions transversely of the path of the particles.

9. Method of producing a uniform mixture of discrete semi-wet particles characterized by a tendency to balling, which comprises causing the same to pass by gravity successively into contact with foraminous screens, spaced apart longitudinally of the path of the particles by a distance less than the average diameters of the lumps to be disintegrated and moving said screens oppositely in respect to the particles.

10. Method of making sheet materials from semi-wet particles characterized by a tendency to balling, which comprises subjecting a supply of the same to a loose shearing action, and thereafter consolidating the dispersed particles into the form desired.

11. Method of making sheet materials from semi-wet particles characterized by a tendency to balling, which comprises passing the same in a continuous stream through a plurality of foraminous screens, depositing the dispersed particles therefrom as upon a conveyor belt, and thereafter consolidating the same into the form of an extended sheet.

12. Method of making sheet materials from semi-wet particles characterized by a tendency to balling, which comprises passing the same in a continuous stream through a plurality of screens, oscillating the screens in successively opposite directions transversely of the path of said stream, collecting the stream of separated particles, and thereafter consolidating the same into the form desired without substantial relative movement between the component particles.

13. Method of making sheet materials from semi-wet particles characterized by a tendency to balling, which comprises passing the same in a continuous stream through a plurality of oppositely oscillated screens, directing the stream therefrom onto a continuously moving conveyor belt, and thereafter consolidating the deposited material into the form of an extended sheet, in situ.

14. Method of producing a uniform mixture of discrete, semi-wet particles which comprises subjecting a supply of the components of the mixture to a loose shearing action, depositing the same substantially without relative movement in the form of a sheet, removing the upper portion of the deposit to the desired contour, and thereafter consolidating the mixture.

15. Method of producing a uniform mixture of discrete, semi-wet particles which comprises subjecting a supply of the components of the mixture to a loose shearing action, depositing the same substantially without relative movement in the form of a sheet, removing the upper portion of the deposit to the desired contour, and thereafter consolidating the mixture with respect to said contour.

16. Apparatus for the preparation of semi-wet mixtures, comprising a plurality of closely superposed foraminous screens and means for oscillating the same transversely in opposite directions.

17. Apparatus for the preparation of semi-wet mixtures, comprising two series of closely and alternately superposed foraminous screens, and means for oscillating the screens of each series transversely and in opposite directions to those of the other.

18. Apparatus for the preparation of semi-wet mixtures, comprising a plurality of superposed foraminous screens, means for oscillating the same transversely and in opposite directions, and means for receiving the discharged particles directly from said screens.

19. Apparatus for the preparation of semi-wet mixtures, comprising a plurality of superposed screens, means for oscillating the same transversely and in opposite directions, and means for continuously receiving the discharge directly from said screens and conveying the same substantially without relative movement of the constituent particles.

20. Apparatus for the preparation of semi-wet mixtures, comprising a plurality of superposed screens, means for oscillating the same transversely and in opposite directions, means for receiving the discharge directly from said screens and substantially without relative movement of the constituent particles, and means for shaping the discharged material in situ.

21. Apparatus for the preparation of semi-wet mixtures, comprising a plurality of superposed screens, means for oscillating the same transversely and in opposite directions, means for receiving the discharge directly from said screens and substantially without relative movement of the constituent particles, and means for consolidating the discharged material in situ.

22. Apparatus for the preparation of semi-wet mixtures, comprising a plurality of superposed foraminous screens and means for oscillating the same transversely and in opposite directions, the upper of said screens being made up of partition strips providing meshes of a considerable depth, proportionate to their area.

23. Apparatus for the preparation of semi-wet mixtures, comprising a pair of superposed foraminous screens, means for oscillating the same transversely and in opposite directions, and means for receiving the discharge directly from said screens and conveying the same therefrom in the form of a continuous sheet.

24. Apparatus for the preparation of semi-wet mixtures, comprising a plurality of closely superposed foraminous screens, means for oscillating the same transversely and in opposite directions, and an agitator immediately adjacent to the first screen effective to keep the charge coming thereto in motion.

25. Apparatus for the manufacture of sheet materials from semi-wet particles characterized by a tendency to balling, which comprises means for mixing the particles with the liquid, means for passing the mixture through a succession of oppositely oscillating screens, and means for receiving and continuously removing the mixture therefrom.

26. Apparatus for the manufacture of sheet materials from semi-wet particles characterized by a tendency to balling, which comprises means for mixing the particles with the liquid, means for passing the semi-wet mixture through a succession of oppositely oscillating screens, and means comprising a belt for receiving and continuously carrying the mixture therefrom in the form of a continuous sheet.

27. Apparatus for the manufacture of sheet materials from semi-wet particles characterized by a tendency to balling, which comprises means for mixing the particles with the liquid, means for passing the mixture through a succession of oppositely oscillating closely spaced screens, means comprising a belt for receiving and carrying away the mixture therefrom, and means for leveling the deposited mixture on said belt to a given uniform thickness.

28. Apparatus for the manufacture of sheet materials from semi-wet particles characterized by a tendency to balling, which comprises means for mixing the particles with the liquid, means for passing the mixture through a succession of oppositely oscillating screens, means comprising a belt for receiving and carrying away the mixture therefrom, means for leveling the deposited mixture on said belt, and means for consolidating said material into a dense sheet.

29. Apparatus for the preparation of semi-wet mixtures comprising a plurality of superposed screens, means for oscillating the same in opposite directions, means for receiving the discharge therefrom, means for shaping the deposited charge to a desired contour, and means for consolidating the shaped charge.

30. Apparatus for the preparation of semi-wet mixtures comprising a plurality of superposed screens, means for oscillating the same in opposite directions, means for receiving the discharge therefrom in the form of a continuous sheet, means for shaping the surface of the deposited charge to a desired contour, and means for consolidating the shaped continuous sheet with respect to the contour thereof.

31. Apparatus for the preparation of semi-wet mixtures comprising a pair of superposed screens, means for oscillating the same in opposite directions, means for receiving the discharge therefrom in the form of a continuous sheet, means for shaping the deposited charge to a tapered thickness, and means for consolidating the shaped charge in situ.

Signed by me at Nashua, New Hampshire, this twenty-fifth day of October, 1927.

JOHN C. MacILDOWIE.